US007526735B2

(12) United States Patent
Fischer et al.

(10) Patent No.: US 7,526,735 B2
(45) Date of Patent: Apr. 28, 2009

(54) AIDING VISUAL SEARCH IN A LIST OF LEARNABLE SPEECH COMMANDS

(75) Inventors: Dominic Fischer, Hamburg (DE); Michael Jacob, Sandhausen (DE); James R. Lewis, Delray Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 10/736,492

(22) Filed: Dec. 15, 2003

(65) Prior Publication Data

US 2005/0131691 A1 Jun. 16, 2005

(51) Int. Cl.
*G06F 3/048* (2006.01)
*G06F 3/00* (2006.01)
(52) U.S. Cl. .................... 715/825; 715/705
(58) Field of Classification Search ............ 715/705, 715/825, 812, 707; 704/246, 231, 250
See application file for complete search history.

(56) References Cited

U.S. PATENT DOCUMENTS

| 5,125,071 A | * | 6/1992 | Ozeki ................... 715/811 |
| 5,386,494 A | | 1/1995 | White |
| 5,396,264 A | * | 3/1995 | Falcone et al. ............ 715/811 |
| 5,420,975 A | * | 5/1995 | Blades et al. ............. 715/811 |
| 5,884,249 A | * | 3/1999 | Namba et al. ................ 704/9 |
| 5,923,325 A | * | 7/1999 | Barber et al. ............. 715/711 |
| 6,085,159 A | * | 7/2000 | Ortega et al. .............. 704/235 |
| 6,101,338 A | | 8/2000 | Bernardi et al. |
| 6,505,155 B1 | | 1/2003 | Vanbuskirk et al. |
| 2002/0075320 A1 | * | 6/2002 | Kurapati .................. 345/811 |
| 2002/0180804 A1 | * | 12/2002 | Ishii ....................... 345/811 |
| 2003/0078784 A1 | | 4/2003 | Jordan et al. |
| 2003/0093275 A1 | | 5/2003 | Polanyi et al. |

OTHER PUBLICATIONS

Speech interfaces that Require Less Human Memory, Dan Newman, Jul./Aug. 2000, from URL:http://www.speechtek.com/ME2/Audiences/dirmod.asp?sid=&nm=&type=Publishing&mod=Publications%3A%3AArticle&mid=8F3A7027421841978F18BE895F87F791&tier=4&id=3A20144A4A1A438D9B7C623047D87D7F.*
Organization-Wide Learning (OWL) Helps Users Learn Information Technology Skills, The MITRE Corporation, Oct. 7, 1999, from URL: http://www.mitre.org/news/digest/archives/1999/owl.html.*

* cited by examiner

*Primary Examiner*—Stephen Hong
*Assistant Examiner*—Samir Termanini
(74) *Attorney, Agent, or Firm*—Akerman Senterfitt

(57) ABSTRACT

A method, a system, and an apparatus for aiding a visual search in a list of learnable speech commands. The present invention is capable of making less commonly-used commands more salient and more commonly-used commands less salient. The present invention takes measurements of user interactions with a speech recognition interface and uses the measurements to aid in determining whether a user has learned or memorized more commonly-used commands. These more commonly-used commands are made less salient such that the unlearned commands are easier to find, thereby reducing the visual search time needed by a user.

9 Claims, 2 Drawing Sheets

| Alpha | Bravo | Charlie | Dog | Echo | Frank |
|-------|-------|---------|-----|------|-------|
| Golf | Hotel | India | Jane | Kilo | Lima |
| Mike | North | Oscar | Papa | Queen | Romeo |
| Sierra | Tango | Under | Victor | Water | X-ray |
| Yoyo | Zulu | Space || "End Spell" ||

FIG. 1a

| Alpha | Bravo | Charlie | Dog | Echo | Frank |
|-------|-------|---------|-----|------|-------|
| Golf | Hotel | India | Jane | Kilo | Lima |
| Mike | North | Oscar | Papa | Queen | Romeo |
| Sierra | Tango | Under | Victor | Water | X-ray |
| Yoyo | Zulu | Space || "End Spell" ||

FIG. 1b

AIDING VISUAL SEARCH IN A LIST OF LEARNABLE SPEECH COMMANDS

BACKGROUND

1. Field of the Invention

The present invention relates to the field of speech recognition and, more particularly, to speech-based user interfaces.

2. Description of the Related Art

Speech recognition is the process by which an acoustic signal is converted to a set of text words by a computer. These recognized words may then be used in a variety of computer software applications for purposes such as document preparation, data entry and command and control. Speech recognition is generally a difficult problem due to the wide variety pronunciations, individual accents and speech characteristics of individual speakers. For example, the speaker may speak very rapidly or softly, slur words or mumble. When transcribing speech dictation, this may result in: spoken words being converted into different words ("hold" recognized as "old"); improperly conjoined spoken words ("to the" recognized as "tooth"); and spoken words recognized as homonyms ("boar" instead "bore"). However, when controlling and navigating through speech-enabled applications by voice, incorrect recognition or non-recognition typically results in the execution of unintended commands or no command at all.

To rectify incorrectly recognized voice commands, conventional speech recognition systems include a user-initiated interface or window containing a list of possible commands. The list may be a listing of the entire speech command vocabulary, or a partial listing constrained by acoustic, language or context modeling techniques known in the art. The constrained lists are much more user friendly, since the speaker does not have to read through a lengthy list to find an intended command. These constrained lists can be generated, for example, by executing an algorithm, as is known in the art, one much like a spell checking program in word processing applications, to search a command grammar for words with similar characteristics as the incorrectly recognized words. Once the list is generated, the user may select the intended command by voice or input device. Alternatively, the user may key in the desired command in a text field within the user interface.

One of the problems with a user-initiated interface or window containing a list of possible commands is that the command list does not change as users become more familiar with certain commands. However, for less commonly-used commands, the user must still view all of the possible commands, including the commonly-used commands with which the user is familiar. Such is the case with respect to both corrective types graphical user interfaces ("GUI") as well as so called "What-Can-I-Say" dialog boxes or interfaces.

Accordingly, it would be beneficial to adjust the command list, thereby highlighting less commonly-used commands and/or reducing the salience of more commonly-used commands. This would reduce the visual search time for a user, thereby increasing the user's efficiency and/or speed of using the speech recognition system.

SUMMARY OF THE INVENTION

The present invention provides a method, a system, and an apparatus for aiding a visual search in a list of learnable speech commands. More specifically, the present invention is capable of making less commonly-used commands more salient and more commonly-used commands less salient. The present invention takes into account the evidence that a user has learned or memorized the more commonly-used commands, thereby reducing the visual search time needed by a user.

In general, the present invention provides a method of aiding a visual search in a list of learnable speech commands. The system presents a list of commands for a graphical user interface and monitors for a user to select a voice command from the command list. Once the user has spoken a command, the system updates the command measurements in the database and then compares the updated command measurements with the criteria set forth for adjusting the graphical user interface. If the updated command measurements do not satisfy the criteria set forth for adjusting the graphical user interface, then the display of the command is not adjusted. However, if the updated command measurements do satisfy the criteria set forth for adjusting the graphical user interface, then the display of the command is adjusted.

More particularly, in one embodiment, the present invention provides a method for aiding a visual search in a list of learnable speech commands including the steps of presenting a display list of commands to a user; monitoring whether the user has selected a command; measuring an evidentiary value; comparing the evidentiary value to a programmed value to determine if an adjustment criteria has been satisfied; and adjusting the display of the selected command.

More particularly, in another embodiment, the present invention provides a machine-readable storage having stored thereon, a computer program having a plurality of code sections, said code sections executable by a machine for causing the machine to perform the steps of presenting a display list of commands to a user; monitoring whether the user has selected a command; measuring an evidentiary value; comparing the evidentiary value to a programmed value to determine if an adjustment criteria has been satisfied; and adjusting the display of the selected command.

In yet another embodiment, the present invention provides a system for aiding a visual search in a list of learnable speech commands including means for presenting a display list of commands to a user; means for monitoring whether the user has selected a command; means for measuring an evidentiary value; means for comparing the evidentiary value to a programmed value to determine if an adjustment criteria has been satisfied; and means for adjusting the display of the selected command.

BRIEF DESCRIPTION OF THE DRAWINGS

There are shown in the drawings, embodiments which are presently preferred, it being understood, however, that the invention is not limited to the precise arrangements and instrumentalities shown.

FIG. 1a is an example of a graphical user interface prior to the method of the present invention and FIG. 1b is an example of a graphical user interface after a period of time has elapsed.

DETAILED DESCRIPTION OF THE INVENTION

Figure 2:
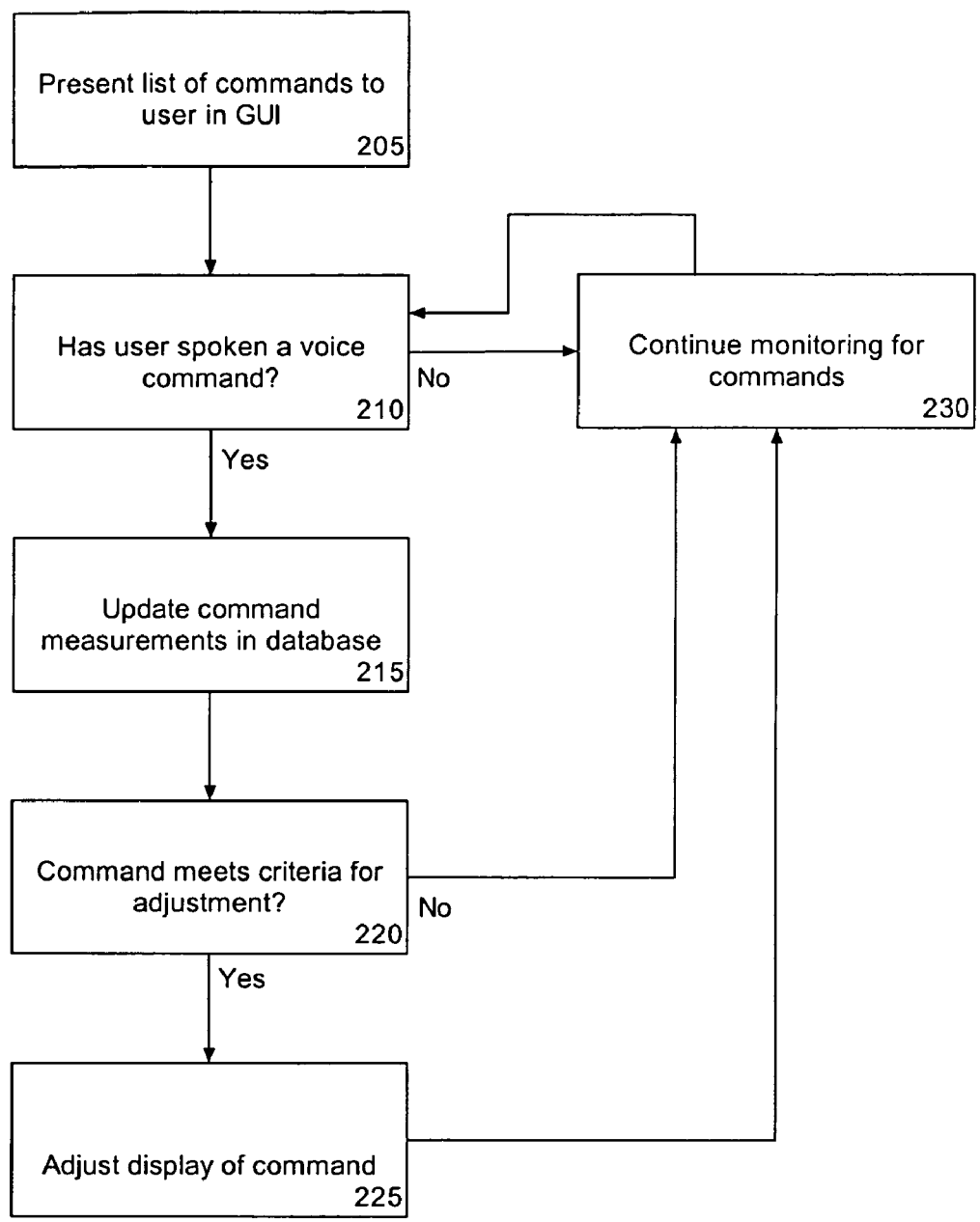
FIG. 2 is a flow chart illustrating a method for aiding a visual search in accordance with the inventive arrangements disclosed herein.

The present invention provides a method, a system, and an apparatus for aiding a visual search in a list of learnable speech commands. More specifically, the present invention makes less commonly-used commands more salient by taking into account evidence that a user has learned or memorized more commonly-used commands. These more commonly-used commands are made less salient such that the unlearned commands are easier to find, thereby reducing the visual search time needed by a user.

Speech recognition systems provide users with many different speech commands for navigating through the system. These command lists remind users of the commands the user can (or should) use in a speech recognition system. As users become more familiar with certain commands, they will use them automatically and will only need to review a command list for the commands that have yet to be memorized. Many different types of command lists may be displayed. In one embodiment, the command list may be a matrix of code words to support voice spelling. In another embodiment, the speech recognition system may present a display of user help commands, such as any listing or GUI displaying a listing of speech recognition software commands. This may include "What-Can-I-Say" interfaces, as well as others.

The present invention tracks measurements of user performance with commands over time. The present invention then uses these measurements to determine the likelihood that a user has become more familiar with a particular command. As the user becomes more familiar with a command, and with the measurement tracking providing evidence of this familiarity, the present invention gradually makes the more familiar command less and less salient on the command list. As a result, the less familiar commands become more salient, i.e. they stand out, on the list, thereby enabling a user to more quickly locate the command, thereby reducing the time needed for the user to execute a command.

The present invention may encompass any method by which more commonly-used commands are made less salient. In one embodiment, if the evidence of user memorization of a command is tracked over time, the command or commands may gradually be grayed or lightened (from black in a black and white display) such that the less commonly-used commands "stand out" in relation to the more commonly-used commands. In this embodiment, the more commonly-used commands may remain grayed or lightened, or they may be removed entirely, such as by placing these commands in an inactive location that the user may refer to in the event the user forgets a command that was once previously memorized.

In an alternative embodiment, the present invention may also operate by making less commonly-used commands more bold, again such that the less commonly-used commands stand out in relation to the more commonly-used commands.

In yet another embodiment, the present invention may also rank the commands in an order based upon the likelihood that the commands have been memorized. For example, as the evidence demonstrates that a command has become memorized, the command can be moved down a list of commands, thereby causing the less commonly-used commands to be listed first, such that the user may quickly identify a command that the evidence demonstrates the user has not learned or memorized.

In still another embodiment, the system may readjust the salience of a command if the evidence demonstrates that a user has forgotten a command that the user appeared to have learned. For example, a command may gradually become grayed or lightened if measured values were less than programmed values. However, if the evidence demonstrates that the measured value is greater than the programmed value, the command may gradually be blackened or darkened, thereby making the command more salient.

The present invention increases the salience of less commonly-used commands and/or reduces the salience of more commonly-used (or memorized) commands by tracking measurements of user performance with these commands over time. FIGS. 1 and 1a present an example of the present invention in relation to a voice spelling interface for a personal data assistant (PDA). As a user gains experience with the code words used in the voice spelling interface, the user will likely use those code words more quickly, i.e. less time will elapse from the end of the utterance of the previous code word to the beginning of the utterance of the current word. By comparing this length of time to a programmed value, the salience of the current word may then be adjusted. The programmed value may be any value deemed to be a "normal" value, such as the measurement of expert users engaged in voice spelling. If the measured time is less than the programmed value, this provides evidence that a user has become more familiar with the command and may have learned or memorized the command. As a result, the system operates to make this command less salient. Over time, as the evidence continues to show a measured time less than the programmed value, the command will become even less salient.

Conversely, if the measured time is equal to or greater than the programmed value, then the evidence demonstrates that a user is not as familiar with the command and the salience of the command remains the same, or may be increased. Nevertheless, even for those commands that remain the same, since memorized commands are being made less salient, those commands that remain the same are still effectively becoming more salient and standing out as compared to the memorized commands.

FIGS. 1 and 1a provide a visual demonstration of the present invention in use. FIG. 1 shows the voice spelling interface for a PDA prior to any adjustment. FIG. 1a shows how the voice spelling interface might appear after several weeks of use. As can be seen, those words that correspond to letters that are more commonly used, such as the vowels and common consonants as well as common commands, have been grayed or lightened while the less commonly-used commands remain black or have been grayed only slightly. As such, the less commonly-used commands stand out in comparison to the more commonly-used commands, thereby enabling a user to more quickly identify the word necessary to be used for less commonly-used and/or unfamiliar letters.

Those skilled in the art will recognize that the present invention may be used with any of a variety of command lists and with any variety of values other than a time value. Accordingly, although a spelling command list and a time value have been used for purposes of illustration, the present invention is not so limited to the particular examples and embodiments as disclosed herein. In particular, the measurement value and the programmed value may be any value that provides evidence to the system that the user has become familiar with and/or memorized a particular command. As such, the system measures this evidentiary value and uses the evidentiary value to determine whether the selected command should be adjusted. As used herein, an "evidentiary value" is a measured value that provides evidence to the system that the user has become familiar with and/or memorized a particular command. In the preceding example, the evidentiary value was the time that elapsed from the end of the utterance of the previous command to the beginning of the utterance of the selected command.

Besides time values, another value that may be used as an evidentiary value in the present invention is a frequency value. A frequency value is a value of the frequency with which the user uses a command. The higher the frequency relative to other commands, the greater the likelihood that a user has memorized the command.

Once the evidentiary value has been measured, it is compared to a programmed value to determine if an adjustment criteria has been met or satisfied. As used herein, an "adjustment criteria" is a criteria set forth in the system such that, if the adjustment criteria is satisfied, the system will operate to adjust the display list of commands whereas if the criteria is not satisfied, the system will not adjust the display list of commands. The adjustment may be to the selected command, the remaining commands or both. The criteria will generally be a comparison of the measured value to the programmed value and the adjustment criteria may be satisfied if the measured value exceeds the programmed value or the adjustment criteria may be satisfied if the measured value is less than the programmed value, depending on which evidentiary value is used.

FIG. 2 is a flow chart illustrating a method 200 for aiding a visual search in accordance with one embodiment of the present invention. The method 200 may begin in step 205 where the system presents a list of commands within a graphical user interface. In step 210, the system monitors for a user to speak a voice command. The command may be any speech command used in a graphical user interface, such as a spelling command in a voice spelling interface or a help request in a user help interface.

Once the user has spoken a command, the system updates the command measurements in the database in step 215. The system, in step 220, then compares the updated command measurements with the criteria set forth for adjusting the graphical user interface. If the updated command measurements do not satisfy the criteria set forth for adjusting the graphical user interface, then the display of the command is not adjusted. However, if the updated command measurements do satisfy the criteria set forth for adjusting the graphical user interface, then the display of the command is adjusted in step 225. In either instance, the system returns to step 230 and continues monitoring for spoken commands unless the user terminates the program.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of aiding a visual search in a list of learnable speech commands by making less frequently-used commands more salient and more frequently-used commands less salient comprising:
    presenting a display list of commands to a user;
    monitoring whether the user has uttered one of said commands;
    measuring an evidentiary value related to the utterance of said uttered one of said commands, wherein said measuring comprises determining an initial time that a previous utterance uttered by the user ended, determining a succeeding time that the utterance of said uttered one of said commands started, and computing a time elapsed between the initial and succeeding times, said evidentiary value being the time elapsed between the initial and succeeding times, said evidentiary value being the time elapsed between the end of a previous utterance and the start of the utterance of said uttered one of said commands;
    comparing the measured evidentiary value to a programmed value;
    if the measured evidentiary value is less than the programmed value, decreasing a salience of the command; and
    if the measured evidentiary value is equal to or greater than the programmed value, maintaining the salience of the command unchanged or increasing the salience of the command.

2. The method of claim 1, wherein the saliency of the display of said uttered one of said commands is reduced by lightening the display of the uttered one of said commands.

3. The method of claim 1, wherein the saliency of the display of said uttered one of said commands is reduced by moving the uttered one of said commands down the display list of commands.

4. The method of claim 1, wherein the saliency of the display of said uttered one of said commands is increased by darkening the display of the uttered one of said commands.

5. The method of claim 1, wherein the saliency of the display of said uttered one of said commands is increased by moving the uttered one of said commands up the display list of commands.

6. The method of claim 1, wherein the saliency of the display of said uttered one of said commands is reduced by darkening all of the display list of commands except the uttered one of said commands.

7. The method of claim 1, wherein the saliency of the display of said uttered one of said commands is increased by lightening all of the display list of commands except the uttered one of said commands.

8. The method of claim 1, wherein the display list of commands is selected from a list of spelling commands or a list of help commands.

9. The method of claim 1, wherein the saliency of the display of said uttered one of said commands is reduced by moving the uttered one of said commands from the display list of commands to an inactive location.

* * * * *